United States Patent [19]

Fargo

[11] Patent Number: 4,582,294
[45] Date of Patent: Apr. 15, 1986

[54] THREE-WAY SOLENOID VALVE

[75] Inventor: Richard N. Fargo, Newington, Conn.

[73] Assignee: Honeywell Inc., Minneapolis, Minn.

[21] Appl. No.: 718,767

[22] Filed: Apr. 1, 1985

[51] Int. Cl.[4] ............................................. F16K 31/04
[52] U.S. Cl. .......................... 251/129.15; 251/129.21;
251/282; 137/625.65
[58] Field of Search ....................... 251/139, 141, 282;
137/625.65

[56] References Cited

U.S. PATENT DOCUMENTS

| 2,601,989 | 7/1952 | Modes | 251/282 X |
| 2,886,063 | 5/1959 | Ray | 137/625.27 |
| 3,007,672 | 11/1961 | Tischler | 251/139 |
| 4,376,447 | 3/1983 | Chumley | 137/244 |

FOREIGN PATENT DOCUMENTS

| 3111716 | 10/1982 | Fed. Rep. of Germany | 137/625.65 |
| 58-178077 | 10/1983 | Japan | 137/625.65 |

Primary Examiner—Samuel Scott
Assistant Examiner—Allen J. Flanigan
Attorney, Agent, or Firm—Mitchell J. Halista; Trevor B. Joike

[57] ABSTRACT

A three-way solenoid valve uses a movable armature housed in a coaxial sleeve and having longitudinal fluid channels on its outer surface and a fluid sealing element on both ends. A first fluid sealing element on a first end of the armature is a resilient ring arranged to cooperate with an adjacent fluid orifice in a valve body to peripherally seal the fluid orifice in response to spring pressure exerted by a spring acting on the first end of the armature in a first position of the armature during an deenergized state of the valve. The armature is provided with a coaxial longitudinal bore aligned with the center hole in the fluid sealing ring. During the deenergized state of the valve, a fluid path is provided between a first fluid port and second fluid port in the valve body via the hole in the sealing ring, the bore in the armature and the channels on the armature. During an energized state of the valve, the armature is repositioned to a second position to effect a seal between the fluid sealing element on the second end of the armature and a fixed plug in the valve to interrupt the fluid path along the channels on the armature. In this state of the valve, the sealing ring is separated from the adjacent fluid orifice to provide a fluid path between the first fluid port and a third fluid port. A rolling diaphragm seal is arranged between the armature and the valve body to isolate the second port from the first and third ports.

16 Claims, 2 Drawing Figures

F I G. I

THREE-WAY SOLENOID VALVE

BACKGROUND OF THE INVENTION

1. Field of the Invention

The present invention is directed to solenoid valves. More specifically, the present invention is directed to a three-way solenoid valve for selectively directing a fluid flow therethrough between a fluid inlet port and a first and a second fluid outlet port.

2. Description of the Prior Art

Prior art attempts to provide a three-way solenoid valve for directing a fluid flow between a first inlet port and a first and a second outlet port have usually required a large force to operate the movable armature inasmuch as a pressure difference was present between the ends of the armature. Such an unbalanced state of the armature required a high actuating force to move the armature. In other prior art designs that attempted to produce a pressure balanced valve configuration, the resulting structure failed to produce a design which completely eliminated any net pressure force acting on the movable armature as well as minimizing frictional forces acting on the armature to resist its opening by an energization of the solenoid coil in the valve. Accordingly, it would be desirable to provide a three-way solenoid valve which overcomes the aforesaid shortcomings of the prior art to provide a selective valving action while minimizing the magnetic force required to actuate the movable armature of the valve.

SUMMARY OF THE INVENTION

The object of the present invention is to provide an improved three-way solenoid valve for selectively inconnecting a fluid inlet port with a first and a second fluid outlet port.

Another object of the present invention is to provide an improved solenoid valve having a pressure balanced operation and minimal frictional forces to minimize the valve operating force.

In accomplishing these and other objects, there has been provided, in accordance with the present invention, a solenoid valve having an orifice means defining a first fluid channel, first sealing means for peripherally sealing the first fluid channel while defining a second fluid channel extending therethrough and coaxially aligned with the first fluid channel, armature means for urging the sealing means toward the orifice means and including a movable armature having at least one longitudinal third fluid channel on an outer surface of the armature and a coaxial bore extending through the armature with a first end of the bore being coaxially aligned with the second fluid channel, second sealing means for sealing a second end of the bore, armature drive means for selectively positioning the armature to space the first sealing means from the orifice means and concurrently to seal the second end of the bore by the second sealing means and resilient sealing means contacting the armature to isolate the third fluid channel from the orifice means.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Detailed Description

Figure 1:
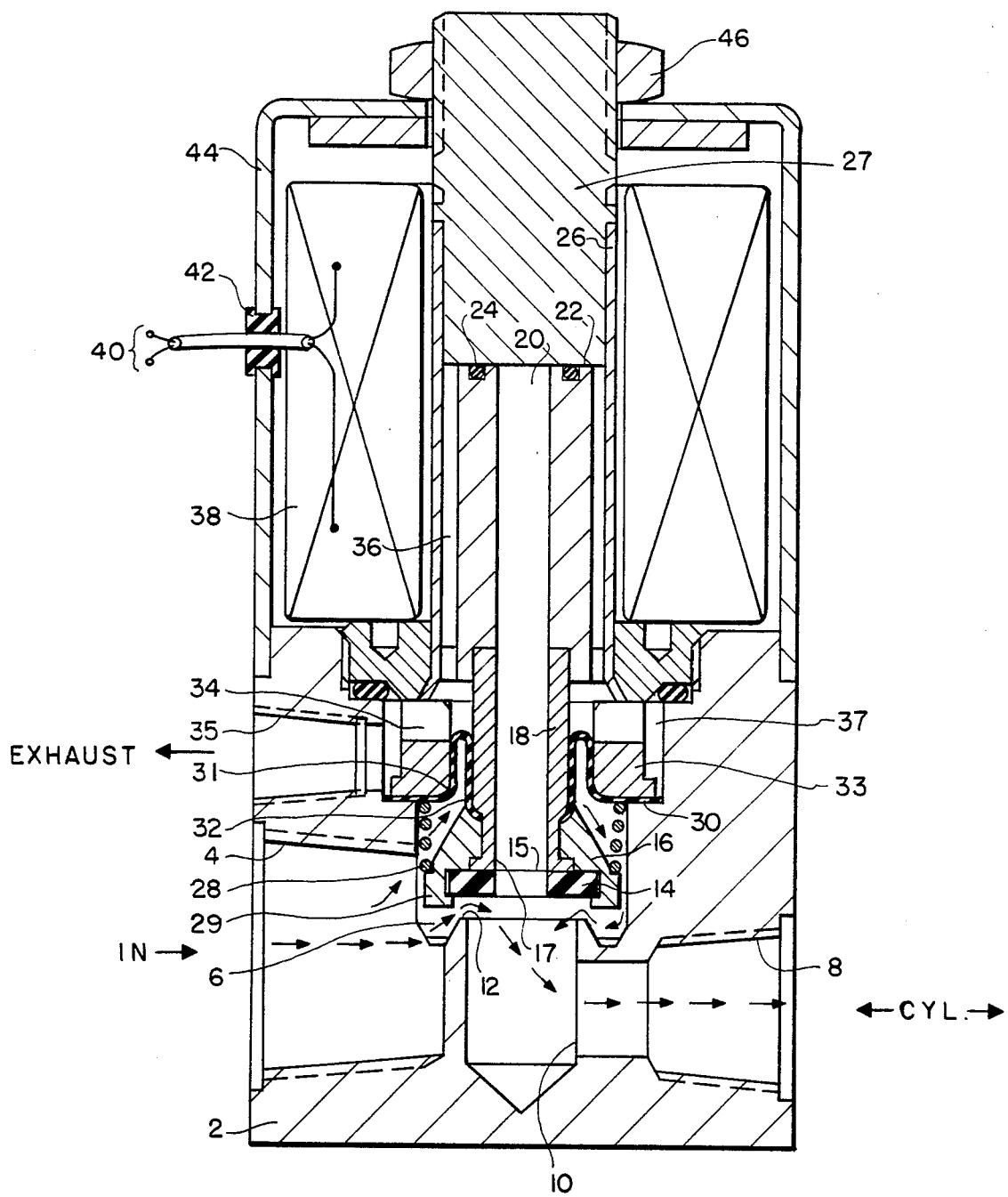
FIG. 1 is a cross-sectional illustration of a three-way solenoid valve embodying an example of the present invention in an energized state and FIG. 2 is a cross-sectional illustration of the valve shown in FIG. 1 in a nonenergized state.

Referring to FIG. 1 in more detail, there is shown a cross-sectional illustration of a three-way solenoid valve embodying an example of the present invention and having a valve base or body 2 with a first fluid port 4 connected to a fluid channel 6 in the valve body 2. A second fluid port 8 in the valve body 2 is connected to a fluid channel 10 which terminates in a fluid orifice 12 communicating with the fluid channel 6 in the valve body 2.

A fluid sealing ring 14 is peripherally captured by an annular collar 16 attached to a first end 17 of a movable armature 18. The sealing ring 14 is exposed to the orifice 12 and is arranged to peripherally seal the orifice 12 in a deenergized state of the valve. The sealing ring 14 is coaxially aligned with a first end 15 of a longitudinal bore 20 extending through the armature 18. A second end 22 of the armature 18 is provided with an outwardly projecting fluid sealing member, e.g., O-ring 24, coaxially surrounding the bore 20. The armature 18 is located within a cylindrical sleeve 26 having one end supported on the valve body 2. A fixed end stop 27 is retained within the other end of the sleeve 26 adjacent to the second end 22 of the armature 18 to provide a fluid sealing surface for the fluid sealing member 24.

A coaxial spring 28 is arranged to have one end supported on a shoulder 29 of the collar 16 to urge the armature 18 and the ring 14 against the orifice 12. The other end of the spring 28 is arranged to bear against an outer edge 30 of a rolling diaphragm seal 31 coaxially surrounding the armature 18 and having an inner edge 32 attached to an outer surface of the armature 18 to provide a fluid tight seal therewith. The outer edge 30 of the diaphragm 31 is further captured between the valve body 2 and a retaining ring 33 having peripheral fluid channels 34 therein. A third fluid port 35 is located in the valve body 2 on the other side of the diaphragm seal 31 from the first port 4 whereby the third port 35 is isolated from the first port 4 by the diaphragm seal 31. The third port 35 is connected to an annular recess 37 communicating with the fluid channels 34 in the ring 33.

A solenoid coil assembly 38 in the form of an annulus surrounding a portion of the sleeve 26 adjacent to the armature 18 is supported on the valve body 2. The solenoid coil assembly 38 is shown in simplified form in FIGS. 1 and 2 and may include an electromagnetic winding and a magnetic field structure. The solenoid coil 38 is provided with an electrical connection 40 through a grommet 42 in an outer cover 44 surrounding the solenoid coil asssembly 38 and mounted on the valve body 2. A retaining nut 46 on a threaded outer end of the end stop 27 extending past the cover 44 is used to retain the cover 44 on the valve body 2.

The valve illustrated in FIG. 1 is shown in an energized state, i.e., electrical current is applied to the solenoid coil 38 from a power supply (not shown) to move the armature 18, wherein the armature 18 is in a first position and the sealing ring 14 is spaced from the orifice 12. In this position of the sealing ring 14 and the armature 18, the sealing member 24 is in contact with the end plug 27 to effect a fluid-tight seal therewith whereby a fluid path between the bore 20 in the armature 18 and channels 36 on the surface of the armature 18 is interrupted. In this position of the armature 18 and the sealing ring 14, the first fluid port 4 is connected to the second fluid port 8 through the orifice 12 and the fluid channels 6 and 10 to provide a fluid flow channel therebetween.

Figure 2:
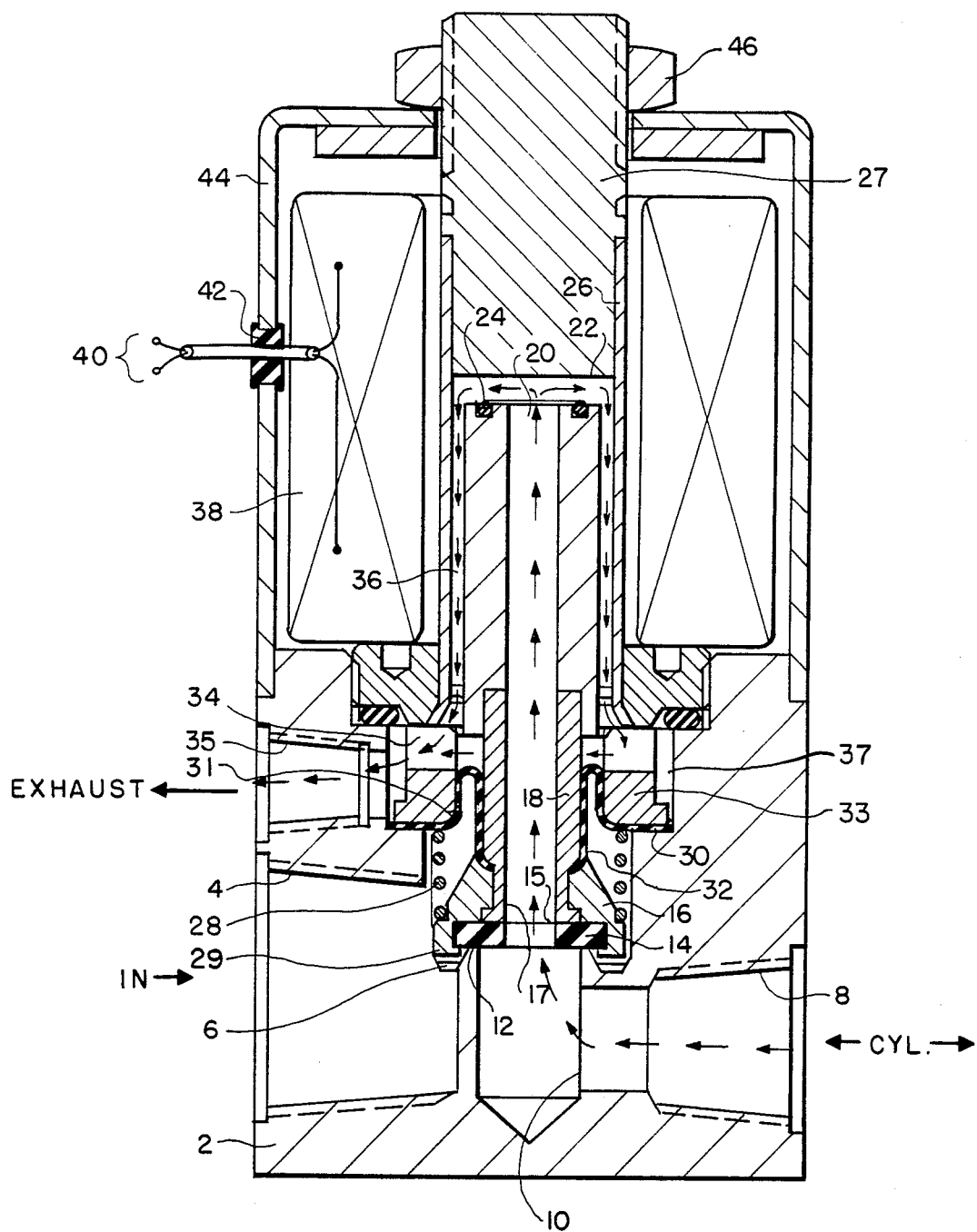

In FIG. 2, there is shown a nonenergized state of the valve, i.e., the solenoid coil 38 is deenergized, wherein the armature 18 is in a second position, and the sealing ring 14 is urged against the periphery of the orifice 12 by the spring 28. In this condition of the valve, the first inlet port 4 is isolated from the second outlet port 8 and the third outlet port 32 while a fluid channel is provided from the second outlet port 8 to the outlet port 32 through the coaxial bore 20 in the armature 18 since the sealing member 24 is now spaced from the end plug 27. Thus, the fluid flow is effected through the bore 18 and the channels 36 on the armature 18 to provide a fluid channel between the second fluid port 8 and the third fluid port 32.

When the valve of the present invention is deenergized, the first port 4 and the area surrounding the orifice 12 and the sealing ring 14 are exposed to the same pressure. Concurrently, the outlet port 32 is open to the second port 8 whereby the top and bottom of the armature 18 are exposed to the same low pressure whereby there is essentially no net pressure force acting on the armature 18 to resist its movement by the magnetic field produced by the energization of the solenoid 38. Additionally, any net pressure force due to a difference between the diameter of the rolling diaphragm 31 and the diameter of the sealing ring 14 can be eliminated by a suitable design thereof. When the valve is energized, the seal member 24 interrupts the flow path to the third port 32. The first port 4 is now opened directly to the outlet port 8 through the orifice 12 which allows a pressure balance as a result of the pressure acting on the top of the armature 18, inside the seal ring 14 and the bottom of the armature 18. Further, during the nonenergized state of the valve the fluid flow along the outside of the armature 18 through the channels 36 serves to provide an initial measure of static lubrication to the armature 18 whereby to facilitate the initial movement of the armature in response to a magnetic field from the solenoid 38. The fluid flow through the channels 36 is interrupted upon the separation of the seal ring 14 from the orifice 12 to minimize any dashpot effect on the armature 18. Accordingly, the advantages of the design of the present invention are to provide a pressure balanced armature which is exposed to a lubricating fluid flow to greatly reduce the magnetic force required to actuate the armature in a simple design which is economical to manufacture and provides a configuration wherein all of the ports are in the valve body.

Accordingly, it may be seen, that there has been provided, in accordance with the present invention, an improved three-way solenoid valve.

The embodiments of the present invention in which an exclusive property or privilege is claimed are defined as follows:

1. A solenoid valve comprising orifice means defining a first fluid channel, first sealing means for peripherally sealing said first fluid channel while defining a second fluid channel extending therethrough and coaxially aligned with said first fluid channel, armature means for urging said sealing means toward said orifice means and including a movable armature having at least one longitudinal third fluid channel on an outer surface of said armature and a coaxial bore extending through said armature with a first end of said bore being coaxially aligned with said second fluid channel, second sealing means for sealing a second end of said bore, armature drive means for selectively positioning said armature to space said first sealing means from said orifice means and concurrently to seal said second end of said bore by said second sealing means and resilient sealing means contacting said armature to isolate said third fluid channel from said orifice means.

2. A solenoid valve as set forth in claim 1 wherein said armature means includes resilient means for urging said armature toward said first sealing means to direct said first sealing means against said orifice means.

3. A solenoid valve as set forth in claim 2 wherein said resilient means includes a coil spring arranged to encircle said armature and having one end in contact with said armature.

4. A solenoid valve as set forth in claim 1 wherein said first and second sealing means are attached to respective ends of said armature.

5. A solenoid valve as set forth in claim 1 wherein said first and second sealing means are each resilient rings.

6. A solenoid valve as set forth in claim 1 wherein said resilient sealing means is a rolling diaphragm having a center opening arranged to accommodate said armature.

7. A solenoid valve as set forth in claim 1 wherein said armature means includes a sleeve coaxially housing said armature while allowing a longitudinal motion of said armature in response to said drive means.

8. A solenoid valve as set forth in claim 7 wherein said drive means includes an electromagnetic coil means in the form of an annulus encompassing said sleeve.

9. A three-way solenoid valve comprising orifice means defining a first fluid channel, a first fluid port connected to said channel, first sealing means for peripherally sealing said first channel while defining a second fluid channel extending therethrough and coaxially aligned with said first channel, a second fluid port exposed to an outer periphery of said first sealing means, armature means for urging said sealing means toward said orifice means and including a movable armature having at least one longitudinal third fluid channel on an outer surface of said armature and a coaxial bore extending through said armature with a first end of said bore being coaxially aligned with said second fluid channel, second sealing means for sealing a second end of said bore, armature drive means for selectively positioning said armature to space said first sealing means from said orifice means and concurrently to seal said second end of said bore by said second sealing means, a third fluid port exposed to said third fluid channel remote from said second sealing means and resilient sealing means contacting said armature to isolate said third fluid port from said second fluid port.

10. A valve as set forth in claim 9 wherein said armature means includes resilient means for urging said armature toward said first sealing means to direct said first sealing means against said orifice means.

11. A solenoid valve as set forth in claim 1 wherein said resilient means includes a coil spring arranged to encircle said armature and having one end in contact with said armature.

12. A solenoid valve as set forth in claim 2 wherein said first and second sealing means are attached to respective ends of said armature.

13. A solenoid valve as set forth in claim 1 wherein said first and second sealing means are each resilient rings.

14. A solenoid valve as set forth in claim 1 wherein said resilient sealing means is a rolling diaphragm having a center opening arranged to accommodate said armature.

15. A solenoid valve as set forth in claim 9 wherein said armature means includes a sleeve coaxially housing said armature while allowing a longitudinal motion of said armature in response to said drive means.

16. A solenoid valve as set forth in claim 15 wherein said drive means includes an electromagnetic coil means in the form of an annulus encompassing said sleeve.

* * * * *